United States Patent
Boyle (10) Patent No.: US 12,045,059 B1
(45) Date of Patent: Jul. 23, 2024

(54) METHOD AND SYSTEM FOR AUTONOMOUS COLLECTION OF AIRFIELD FOD

(71) Applicant: Essential Aero, Inc., Rocklin, CA (US)

(72) Inventor: Stephen S. Boyle, Sacramento, CA (US)

(73) Assignee: Essential Aero, Inc., Rocklin, CA (US)

( * ) Notice: Subject to any disclaimer, the term of this patent is extended or adjusted under 35 U.S.C. 154(b) by 0 days.

(21) Appl. No.: 18/203,615

(22) Filed: May 30, 2023

Related U.S. Application Data (63) Continuation-in-part of application No. 17/849,708, filed on Jun. 27, 2022, which is a continuation-in-part of application No. 17/837,662, filed on Jun. 10, 2022.

(60) Provisional application No. 63/450,051, filed on Mar. 5, 2023, provisional application No. 63/215,990, filed on Jun. 29, 2021, provisional application No. 63/215,988, filed on Jun. 29, 2021, provisional application No. 63/215,989, filed on Jun. 29, 2021, provisional application No. 63/215,951, filed on Jun. 28, 2021, provisional application No. 63/215,958, filed on Jun. 28, 2021, provisional application No. 63/209,791, filed on Jun. 11, 2021.

(51) Int. Cl.
G05D 1/00 (2024.01)

(52) U.S. Cl.
CPC ......... *G05D 1/0214* (2013.01); *G05D 1/0278* (2013.01); *G05D 1/0297* (2013.01)

(58) Field of Classification Search
None
See application file for complete search history.

(56) References Cited

U.S. PATENT DOCUMENTS

| | | |
|---|---|---|
| 9,728,089 B2 | 8/2017 | Marcus |
| 9,767,699 B1 | 9/2017 | Borghese et al. |
| 9,875,657 B2 | 1/2018 | Collins |
| 10,559,097 B2 | 2/2020 | Ingrassia et al. |
| 10,665,110 B2 | 5/2020 | Collins |
| 10,690,772 B2 | 6/2020 | Van Voorst |
| 10,741,088 B1 | 8/2020 | Walker et al. |
| 10,894,664 B1 * | 1/2021 | Brady ............... B65G 1/1378 |
| 11,281,905 B2 | 3/2022 | Yakimenko |
| 2001/0013181 A1 * | 8/2001 | Monroe ............... E01H 5/098 37/231 |
| 2001/0052158 A1 * | 12/2001 | Lewis ............... E01H 5/106 15/82 |
| 2005/0046569 A1 * | 3/2005 | Spriggs ............... E01H 1/00 340/551 |
| 2006/0007035 A1 | 1/2006 | Corrigan |
| 2007/0037484 A1 * | 2/2007 | Ohishi ............... B08B 7/02 451/6 |
| 2011/0063445 A1 * | 3/2011 | Chew ............... G08G 5/065 348/E7.085 |

(Continued)

*Primary Examiner* — Thomas E Worden
(74) *Attorney, Agent, or Firm* — Clause Eight; Michael Catania (57) ABSTRACT

A method and system to collect foreign object debris (FOD) from hard surfaces on an airfield autonomously and without the need for operations personnel is disclosed herein. The system comprises a mobile robot, a payload, a remote server and a management application. The mobile robot comprises a battery, an on-board computer, a transceiver and a tow mechanism. The payload is attached to the tow mechanism of the mobile robot, the payload configured to remove FOD from a hard surface.

4 Claims, 7 Drawing Sheets

(56) References Cited

U.S. PATENT DOCUMENTS

| | | | |
|---|---|---|---|
| 2013/0329052 A1* | 12/2013 | Chew | G06T 7/0008 |
| | | | 348/159 |
| 2014/0375770 A1 | 12/2014 | Habel et al. | |
| 2016/0306358 A1* | 10/2016 | Kang | G01S 17/88 |
| 2019/0088025 A1 | 3/2019 | Tamanaha et al. | |
| 2019/0258859 A1 | 8/2019 | Baynes et al. | |
| 2020/0097721 A1* | 3/2020 | Yakimenko | G06T 7/97 |
| 2020/0174503 A1 | 6/2020 | Cheikh et al. | |
| 2020/0279367 A1 | 9/2020 | White | |
| 2022/0167813 A1 | 6/2022 | Thakkar et al. | |
| 2022/0307856 A1* | 9/2022 | Haas | G05D 1/0214 |
| 2022/0354329 A1 | 11/2022 | Thomas et al. | |

\* cited by examiner

METHOD AND SYSTEM FOR AUTONOMOUS COLLECTION OF AIRFIELD FOD

CROSS REFERENCE TO RELATED APPLICATION

The Present Application claims priority to U.S. Provisional Patent Application No. 63/450,051, filed on Mar. 5, 2023, and the Present Application is a continuation-in-part application of U.S. patent application Ser. No. 17/849,708, filed on Jun. 27, 2022, which claims priority to U.S. Provisional Patent Application No. 63/215,951, filed on Jun. 28, 2021, U.S. Provisional Patent Application No. 63/215,989, filed on Jun. 29, 2021, U.S. Provisional Patent Application No. 63/215,990, filed on Jun. 29, 2021, U.S. Provisional Patent Application No. 63/215,958, filed on Jun. 28, 2021, and U.S. Provisional Patent Application No. 63/215,988, filed on Jun. 29, 2021, and the Present Application is a continuation-in-part application of U.S. patent application Ser. No. 17/837,662, filed Jun. 10, 2022, which claims priority to U.S. Provisional Patent Application No. 63/209,791, filed on Jun. 11, 2021, each of which is hereby incorporated by reference in its entirety

STATEMENT REGARDING FEDERALLY SPONSORED RESEARCH OR DEVELOPMENT

Not Applicable

BACKGROUND OF THE INVENTION

Field of the Invention

The present invention generally relates to airfield foreign object debris detection and collection.

Description of the Related Art

Robotic devices have been used to perform a variety of complex tasks. Some robotic devices are suited to perform basic, tedious, and/or time-consuming tasks.

BRIEF SUMMARY OF THE INVENTION

One aspect of the present invention is a system to collect foreign object debris (FOD) from hard surfaces on an airfield autonomously and without the need for operations personnel. The system comprises a mobile robot, a payload, a remote server and a management application. The mobile robot comprises a battery, an on-board computer, a transceiver and a tow mechanism. The payload is attached to the tow mechanism of the mobile robot, the payload configured to remove FOD from a hard surface. The management application is configured to capture an identity and physical location of hard surfaces, obstacles, and boundaries of an airfield. The remote server is configured to store the identity and location of hard surfaces, obstacles, and boundary limitations on the airfield. The remote server comprises a routing algorithm capable of automatically generating the optimal routes from one point to another on the airfield using the hard surfaces, avoiding the obstacles, and staying within the defined boundaries. The remote server is configured to calculate the most efficient route from a current location of the mobile robot to the hard surface assigned along with the most efficient route to traverse the hard surface for FOD collection. The remote server is configured to send the calculated routing to the mobile robot at an assigned time. The mobile robot is configured to execute the request to follow the route, detecting and avoiding unexpected obstacles along the way, and then returning to its assigned home position to dump the collected debris.

Yet another aspect of the present invention is a method for collecting foreign object debris (FOD) from hard surfaces on an airfield autonomously and without the need for operations personnel. The method includes receiving, at a server from a management application, an identity and a physical location of hard surfaces, obstacles, and boundaries of an airfield. The method also includes generating, with a routing algorithm at the server, an optimal route for a mobile robot with a payload from one point to another on the airfield using the hard surfaces, avoiding the obstacles, and staying with in the defined boundaries. The method also includes maintaining, at the server, constant contact and control of the mobile robot on the airfield and the capability to change a robot location and speed at any time. The method also includes transmitting, at the server to the mobile robot, the optimal route and instructions to collect FOD from the airfield. The method also includes receiving, at the server, a completion report from the mobile robot.

Yet another aspect of the present invention is a system to collect foreign object debris from hard surfaces on an airfield autonomously and without the need for operations personnel. The system comprises a plurality of mobile robots with a payload, and a remote server. Each mobile robot comprises a battery, an on-board computer, a transceiver and a tow mechanism. Each payload is attached to the tow mechanism of each of the mobile robot. The payload is configured to remove FOD from a hard surface. The remote server is configured to store the identity and location of hard surfaces, obstacles, and boundary limitations on the airfield. The remote server comprises a routing algorithm capable of automatically generating the optimal routes from one point to another on the airfield using the hard surfaces, avoiding the obstacles, and staying within the defined boundaries. The remote server is configured to calculate the most efficient route from a current location of each of the mobile robots to the hard surface assigned along with the most efficient route to traverse the hard surface for FOD collection. The remote server is configured to send the calculated routing to the mobile robot at an assigned time. Each mobile robot is configured to execute the request to follow the route, detecting and avoiding unexpected obstacles along the way, and then returning to its assigned home position to dump the collected debris.

Yet another aspect of the present invention is a system for detecting foreign object debris (FOD) using a detection machine. The system comprises a detection machine, a computer vision application, an inspection application and a server. The detection machine comprises a location sensor, an intelligent payload comprising an edge processor capable of executing a machine learning model, at least one camera sensor and/or one light detection and ranging (LIDAR) sensor, and a data connection to a ground based data center. The detection machine is a terrestrial robot. The detection device is configured to monitor a movement area surface. The computer vision application is configured to execute to position the camera sensors at specific angles and collect a plurality of images at a plurality of specific locations. The computer vision application is configured to compare a plurality of baseline images with the plurality of collected images to detect a plurality of anomalies. The computer vision application is configured to tag each of the plurality of anomalies with metadata. The computer vision application is configured to transfer the plurality of tagged anomalies to a convolutional neural network of the server for evaluation and classification. The data connection is configured to transmit the anomalies exceeding a predetermined threshold of duplicate detections in the same geographic location on overlapping images to a cloud service. The cloud service is configured to send a notification comprising the anomalies exceeding the predetermined threshold to an inspection application. The inspection application is configured to generate an alert.

The image capturing device is preferably a charge-coupled device (CCD) image sensor or a LIDAR sensor, and a complementary metal oxide semiconductor (CMOS) image sensor. The images are preferably geocoded.

The terrestrial robot is configured to travel on a specific path over a movement area surface, or adjacent to a movement area surface, at a specific speed.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

The present invention is a systematic approach to FOD control. The present invention is a mechanized FOD control measured by the USAF as 1000% more effective than FOD walks. The present invention provides 100% coverage 24 hours a day, 365 days a year. The present invention can clear up to 9.5 acres per hour (422 square feet). The present invention can operate night or day, as no light is required. The present invention can capture objects from 0.125 inch to 8 inches. The present invention has pre-programmed routes, a failsafe location control. The present invention provides coverage analysis and reporting. The present invention is a fully automated robot system. The present invention operates in all weather conditions, from 0° F. to 120° F. The mobile robot has a speed up to 10 mph. The mobile robot has a path precision within 4 inches. The mobile robot has obstacle detection and avoidance.

Figure 1:
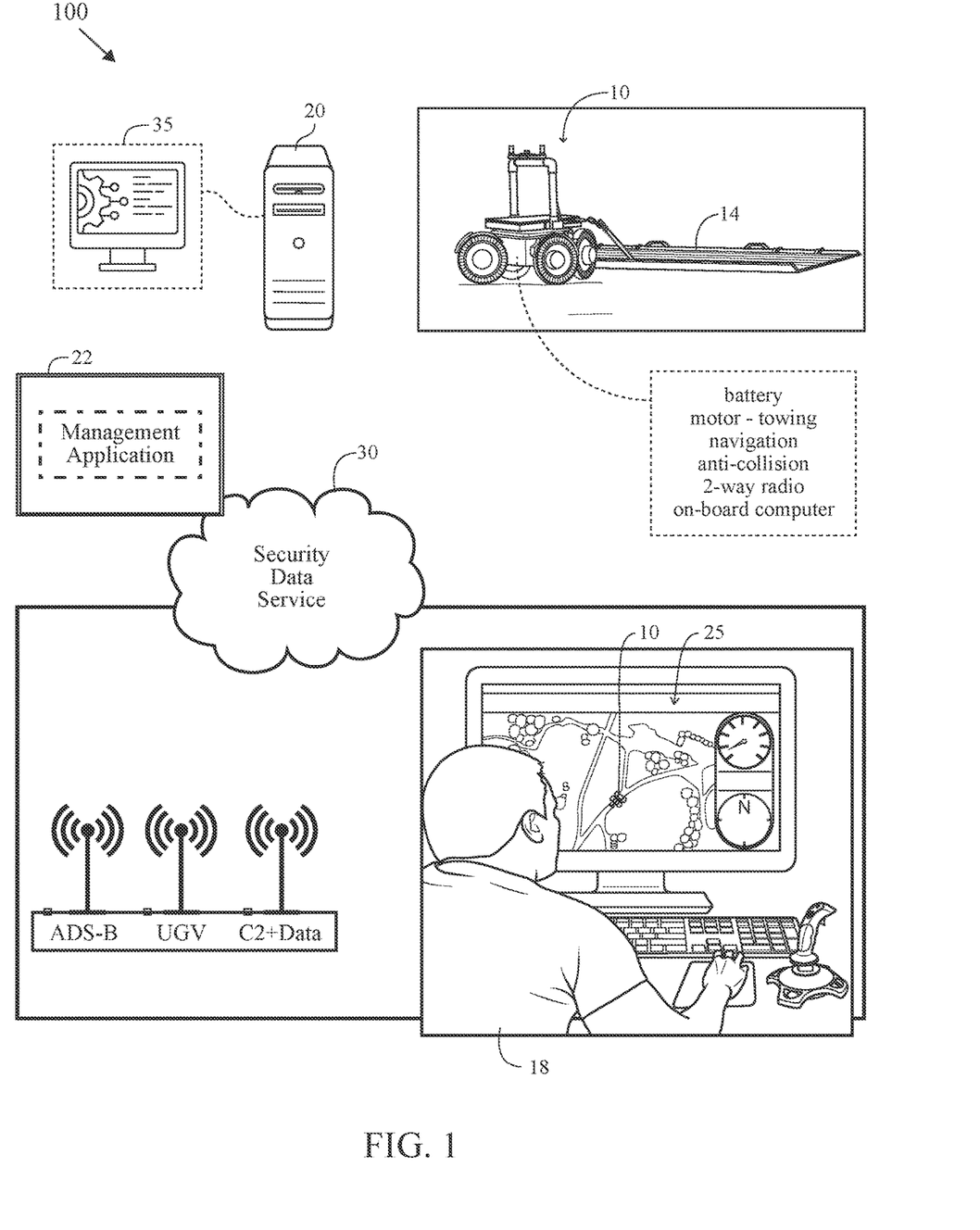
FIG. 1 is an illustration of a system for collecting foreign object debris from hard surfaces on an airfield autonomously and without the need for operations personnel.

A system 100, as shown in FIG. 1, is configured to collect Foreign Object Debris (FOD) from hard surfaces on an airfield autonomously and without the need for operations personnel. The system 100 is comprised of a mobile robot 10, a payload 14, a management application 22, a server based control system 35, and an end user application 25.

Figure 4A:
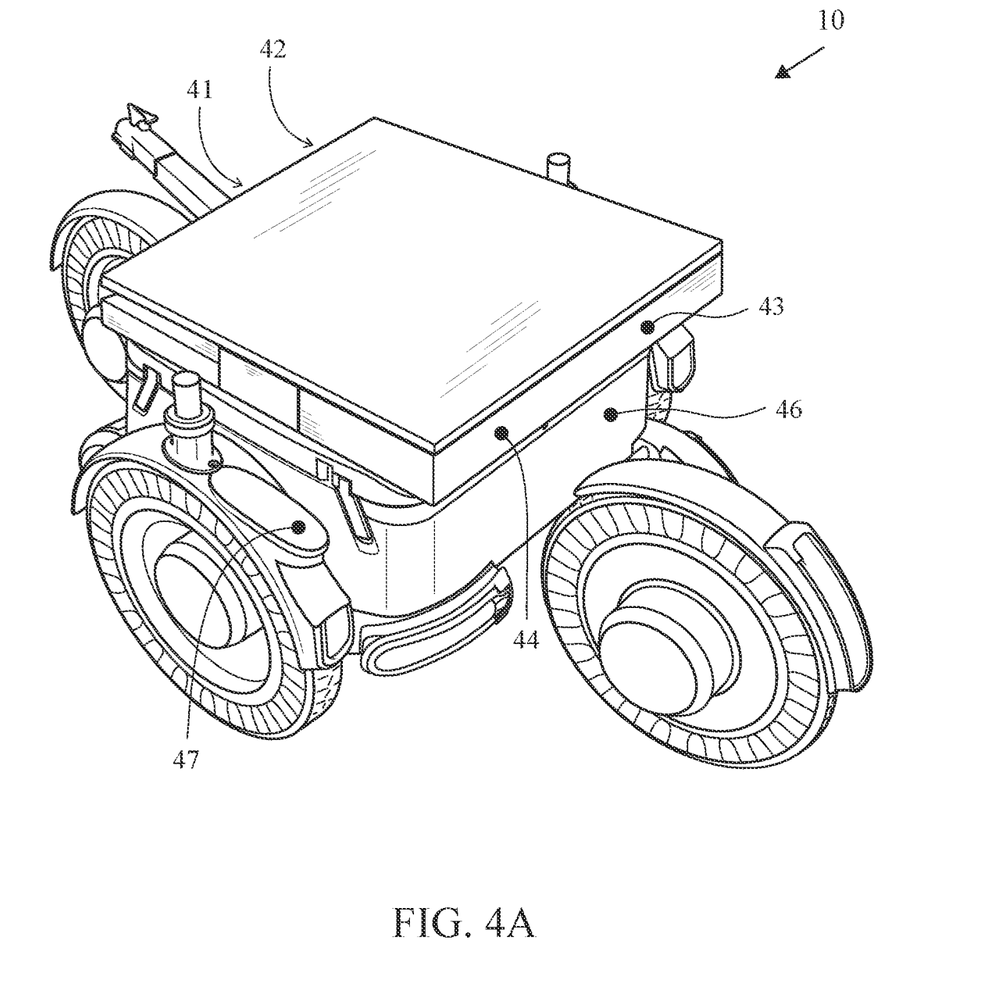
FIG. 4A is an isolated view of a mobile robot.

The mobile robot 10, shown in FIG. 4A, operates on hard surfaces and in all weather conditions, is powered by internal batteries 42, and is equipped with electric motors 46 capable of towing 100 lbs or more going over 5 mph. The robot 10 also includes a navigation system 41 capable of calculating a location within four inches, an anticollision system 47 capable of object detection and avoidance, a 2-way radio system 44 capable of reliable data transport, and an on-board computer system 43 capable of taking requests for navigation from a server based control system 35 and then locally managing the autonomous navigation to fulfill the request. The payload 14 attached to the robot 10 removes FOD.

Figure 4B:
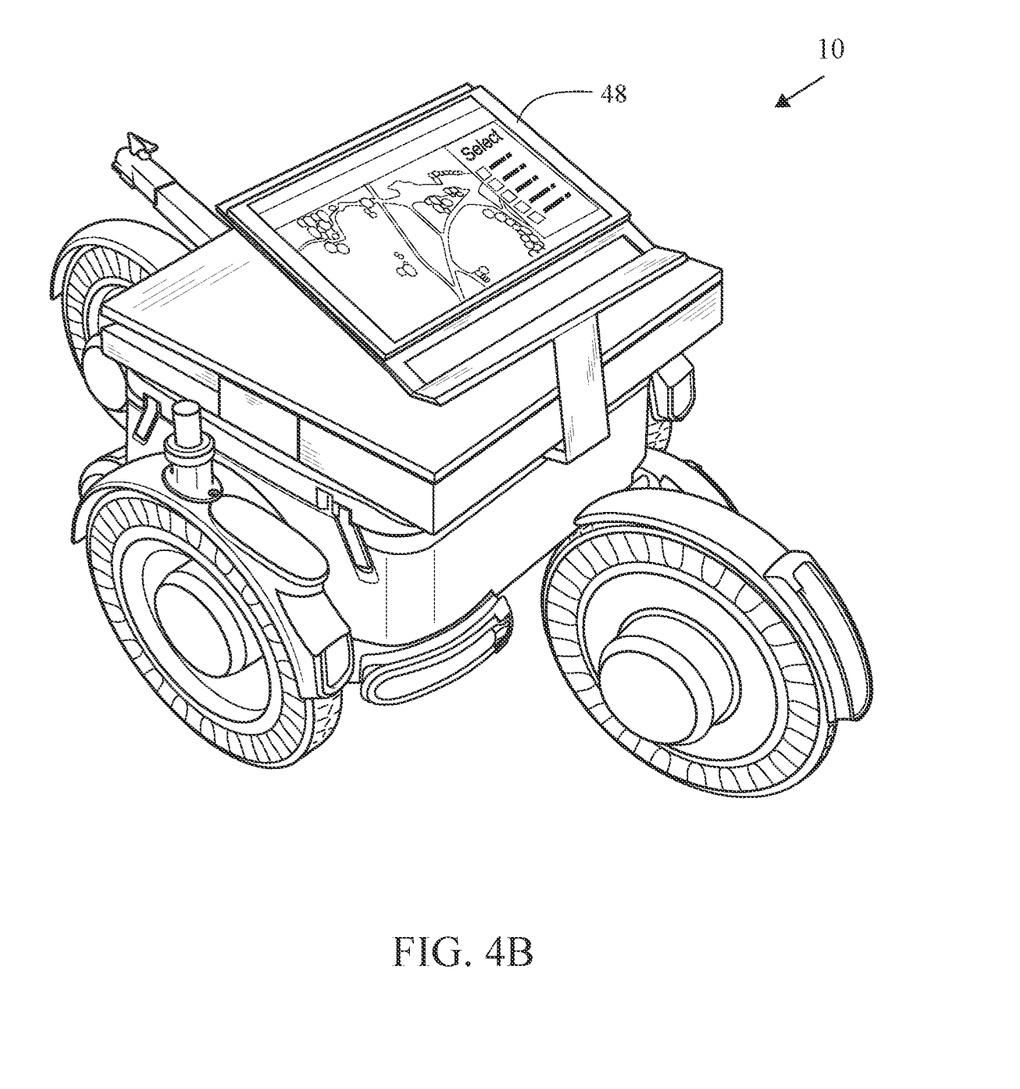
FIG. 4B is an isolated view of a mobile robot with a display.

In another embodiment, the mobile robot 10 comprises a display 48 that can be attached to the robot 10, as shown in FIG. 4B. The display 48 is used as a controller screen, including selecting and assigning the robot 10. In this embodiment, the operator can physically go up to the robot 10 and select the area to clear out of a list of available options (e.g., [1—Ramp A; 2—Ramp B; 3—Terminal B23 Area; etc.]). The operator selects the target from the display 48 on the robot 10 and then touches the [GO] button to initiate the robot's 10 actions.

Figure 3:
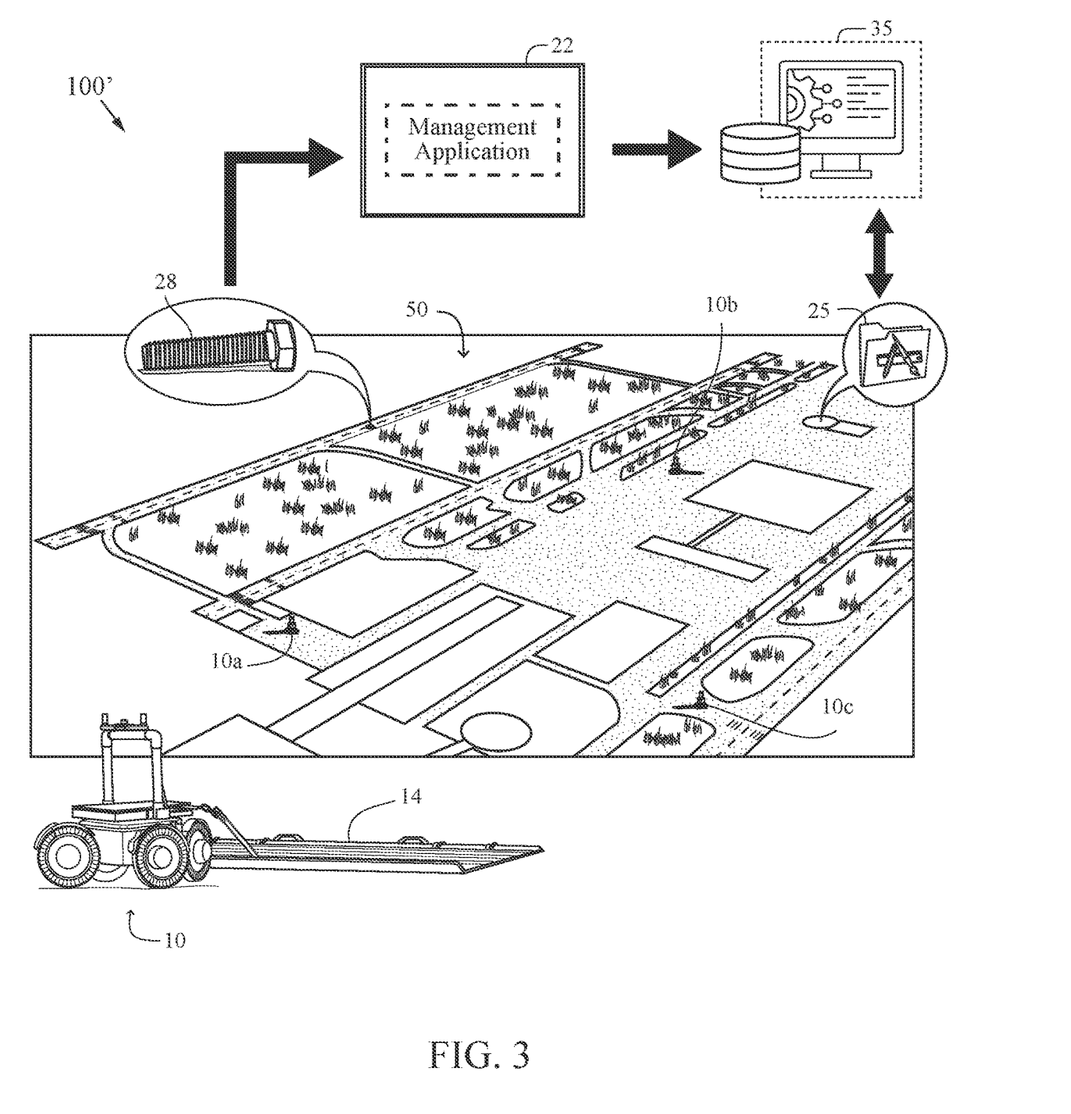
FIG. 3 is an illustration of airport deployment of the system.

The mobile robot 10 preferably comprises an edge processor capable of executing a machine learning model, one or more gimballed camera sensors and one or more LIDAR sensors, and a data connection. Alternatively, the mobile robot 10 comprises one or more gimballed camera sensors or one or more LIDAR sensors. The system further comprises a data center consisting of cloud services 30, an end user application 25, and a remote server 20. An airfield operations personnel 18 uses the end-user application 25 to direct a fleet of robots 10a-10c, as shown in FIG. 3, to clear specific areas on an airfield 50, the end-user application 25 entering the request into the server based control system 35. The server based control system 35 calculates the most efficient route from current robot location to the hard surface assigned along with the most efficient route to traverse the hard surface for FOD collection. The server based control system 35 sends the calculated routing to the assigned robot at the assigned time. The mobile robot 10 executes the request to follow the route, detecting and avoiding unexpected obstacles along the way, and then returning to its assigned home position to dump the collected debris.

It will be apparent to one skilled in the art that the mobile robot may be integrated with one or more cameras, one or more sensors, one or more software modules, lidar, structured light emitters, and LEDs. Various components in the system environment may be interconnected over the network. It should be noted that the mobile robot may include some other modules and components as well, without departing from the scope of the disclosure.

The mobile robot preferably includes a microprocessor, an input device, a memory, a machine learning unit, a tensor processing unit (TPU), a transceiver, a comparator, and an image capturing device. The microprocessor is coupled to the input device, the memory, the machine learning unit, the TPU, the transceiver, the comparator, and the image capture device. The transceiver may connect to the network through the input terminal and the output terminal.

The microprocessor includes suitable logic, circuitry, and/or interfaces that are operable to execute one or more instructions stored in the memory to perform predetermined operations such as painting and cleaning. The microprocessor may be implemented using one or more microprocessor technologies known in the art. Examples of the microprocessor include, but are not limited to, an x86 microprocessor, an ARM microprocessor, a reduced instruction set computer (RISC) microprocessor, a complex instruction set computer (CISC) microprocessor, an application-specific integrated circuit (ASIC), or any other microprocessor.

The input device may comprise suitable logic, circuitry, interfaces, and/or code that may be operable to receive an input from the user. The input may correspond to one or more commands of the user.

The memory stores a set of instructions and data. Some of the commonly known memory implementations include, but are not limited to, a random access memory (RAM), a read-only memory (ROM), a hard disk drive (HDD), and a secure digital (SD) card. Further, the memory includes the one or more instructions that are executable by the microprocessor to perform specific operations. It will be apparent to a person with ordinary skill in the art that the one or more instructions stored in the memory enable the hardware of the system to perform the predetermined operations.

The machine learning unit may use any number of machine learning or artificial intelligence technologies to achieve its purposes, including, but not limited to, neural networks, convolutional neural networks, supervised learning, unsupervised learning, reinforcement learning, and deep learning. Further, the TPU may be an artificial intelligence (AI) accelerator application-specific integrated circuit (ASIC). The TPU may be used for neural network machine learning.

The transceiver transmits and receives messages and data to or from various components of the system environment (e.g., the user computing device) over the network. In some embodiments, the transceiver is coupled to the input terminal and the output terminal through which the transceiver may receive and transmit data/messages, respectively. Examples of the input terminal and the output terminal include, but are not limited to, an antenna, an Ethernet port, a USB port, or any other port that can be configured to receive and transmit data. The transceiver transmits and receives data/messages in accordance with the various communication protocols-such as TCP/IP, UDP, and 2G, 3G, 4G or 5G communication protocols-through the input terminal and the output terminal.

The image capture device may be implemented using one or more image sensing technologies known in the art, such as, but not limited to, a charge-coupled device (CCD) image sensor and a complementary metal oxide semiconductor (CMOS) image sensor.

The network corresponds to a medium through which content and data flow between various components of the system environment. Examples of the network may include, but are not limited to, a Wi-Fi network, a Bluetooth mesh network, a wide area network (WAN), a local area network (LAN), or a metropolitan area network (MAN). Various devices in the system environment may connect to the network in accordance with various wired and wireless communication protocols, such as Transmission Control Protocol over Internet Protocol (TCP/IP), User Datagram Protocol (UDP), and 2G, 3G, 4G or 5G communication protocols. In some embodiments, the network may be a cloud network or cloud-based network.

The platform of the mobile robot is preferably designed for easy and uncomplicated integration with additional hard- or software tools, making it customizable for specific applications. It has a unique wheel frame. It provides unprecedented mobility. It has a multi-purpose platform. It has autonomous driving and precise navigation. A lid of the mobile robot is equipped with hardpoint rails to easily mount applications on top of the robot. The mobile robot follows the basic safety standard (ISO 12100). The mobile robot has a safety PLC, that can remove power to the motors and engage the brakes. The mobile robot has an emergency stop button, that can trigger an e-stop on the safety PLC The mobile robot has sensor bumpers in front of the robot, that can trigger an e-stop on the safety PLC.

A 2 inch platform is added on top of the mobile robot.

A management application is preferably cloud based so logic and algorithms run in the cloud, with a user interface running on a desktop or table web browser.

Figure 2:
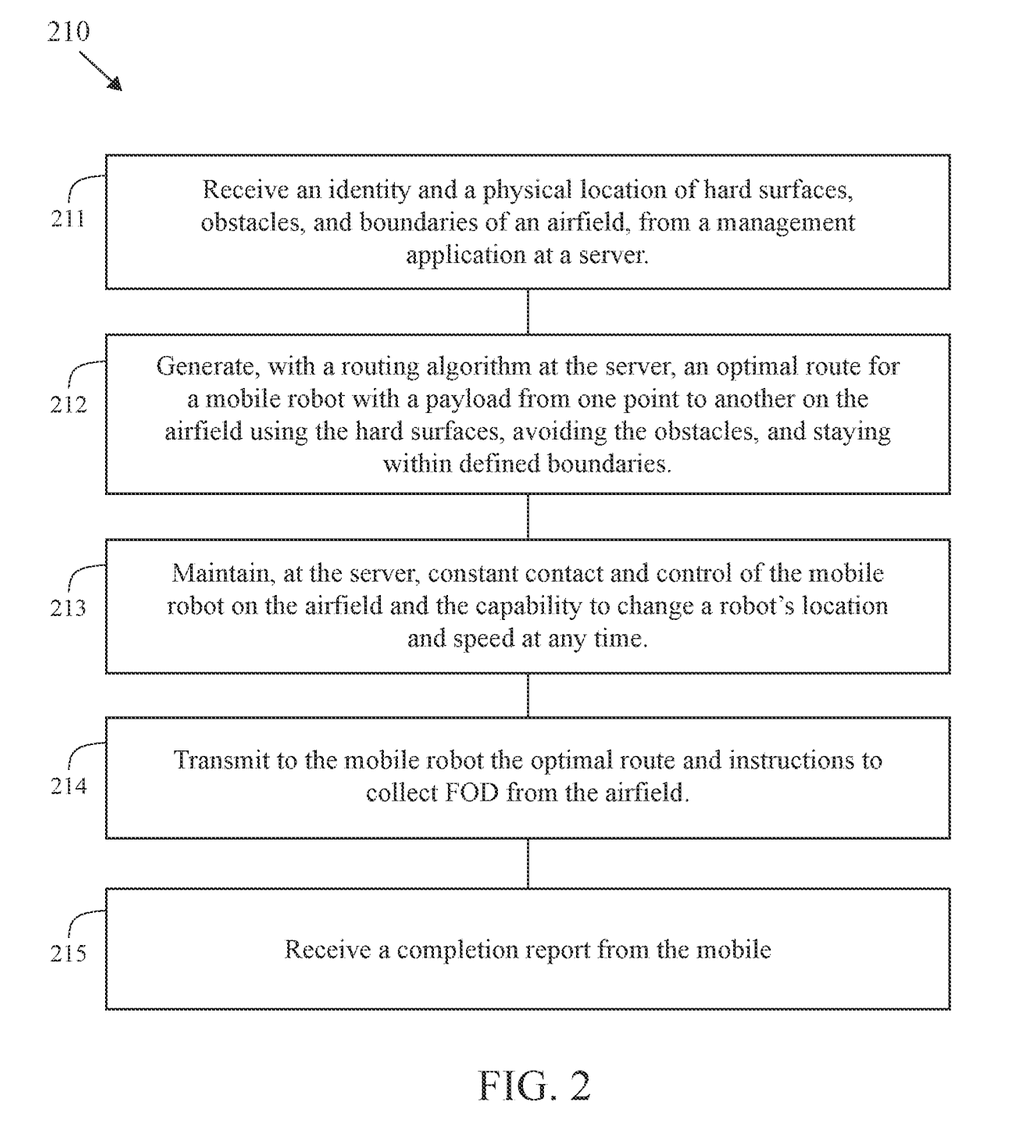
FIG. 2 is a flow chart for a method for collecting foreign object debris from hard surfaces on an airfield autonomously and without the need for operations personnel.

FIG. 2 is a flow chart 210 for a method for collecting foreign object debris from hard surfaces on an airfield autonomously and without the need for operations personnel. Step 211 starts with receiving, at a server from a management application, an identity and a physical location of the hard surfaces and boundaries of an airfield. Step 212 is generating, with a routing algorithm at the server, an optimal route for a mobile robot with a payload from one point to another on the airfield using the hard surfaces, avoiding the obstacles, and staying within the defined boundaries. Step 213 is maintaining, at the server, constant contact and control of the mobile robot on the airfield and the capability to change a robot location and speed at any time. Step 214 is transmitting, at the server to the mobile robot, the optimal route and instructions to collect FOD from the airfield. Step 215 is receiving, at the server, a completion report from the mobile robot.

Figure 5:
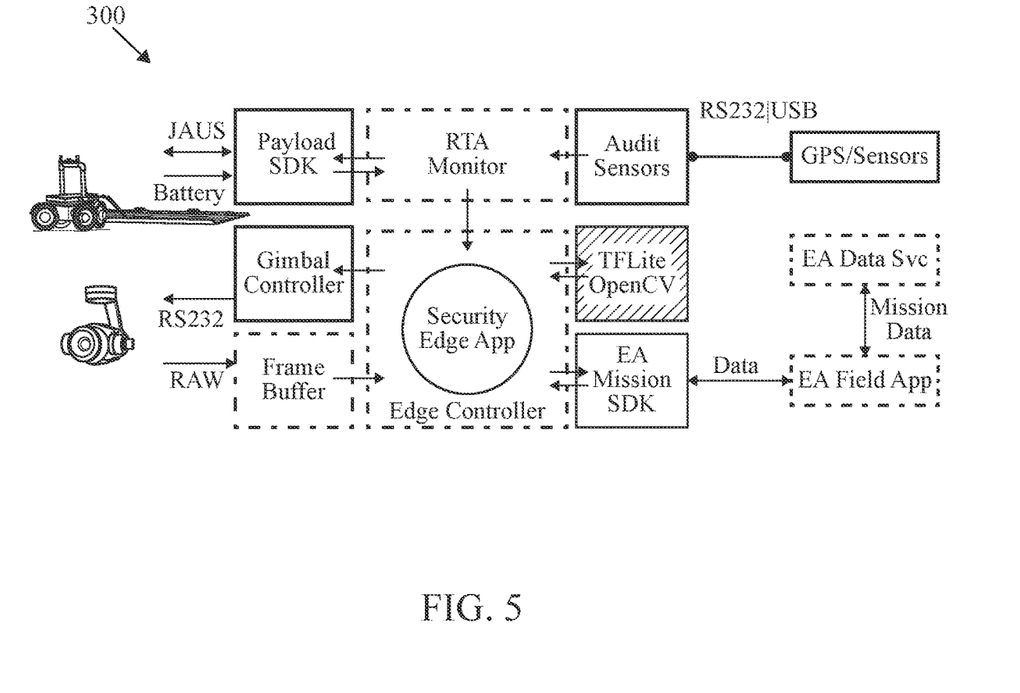
FIG. 5 is a block diagram of a mission edge app RT.

FIG. 5 shows a mission edge app RT 300.

Figure 6:
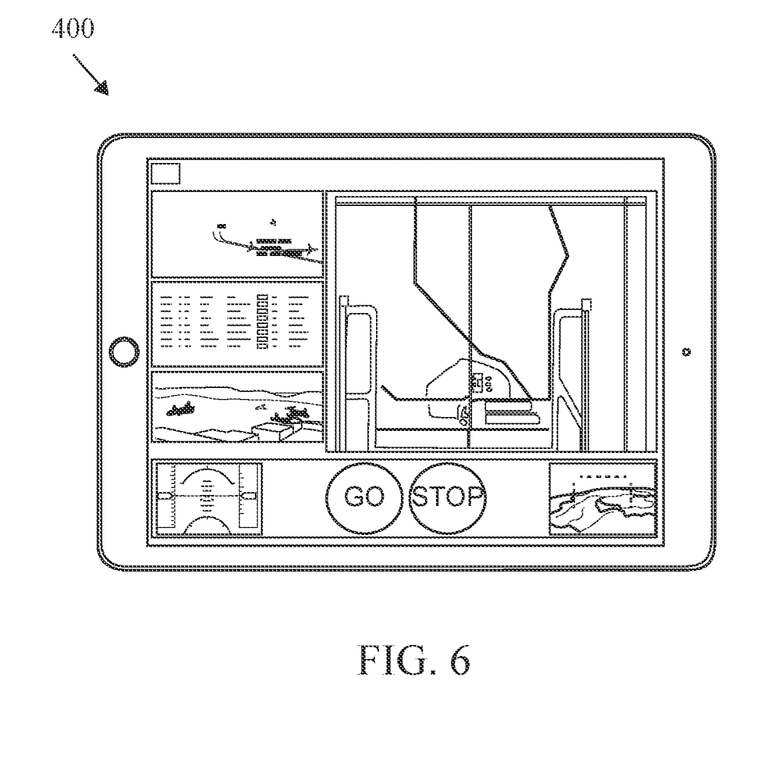
FIG. 6 is an illustration of a page of the UI on a mobile device.

FIG. 6 shows a page of the UI on a mobile device 400. An end-user device of the system is preferably a mobile device 400 with a user application used to identify which hard surface to clear and when to begin, capable of connecting to the server based control system and interacting with the mobile robot in operation.

Edge Application Elements: Virtualization; Container Management; Camera interface drivers (camera stream, gimbal control); Field App Connectivity; Data Service Connectivity; CNN Engine (TFLite Interpreter); CNN Model Manager; GNSS/RTK interface; Baseline image store and synchronizer; Image comparison engine (OpenCV).

Security Data Service: Customer-Internal CRUD, Profile: Typical data, ticketing; User-Invitation subscription, Security credentials: Email, SSO ESRI, Access Permissions; Mission-Security only at MVP→Collection of Security Inspections; Security Inspection-Collection of Images→images in S3 type storage, Metadata: RPIC, Operator, Status/State, Pre-brief, Post-Brief, Checklists, Pix4D photo mosaic engine.

Image Capture Steps: Pull in frame buffer; Options-Calculate new portion +x % based upon speed, discard the rest, Find last image in new image, discard duplicate portion; Perform micro analysis on new portion; Stitch new portion to mosaic; Perform macro analysis on mosaic.

The disclosed methods and systems, as illustrated in the foregoing description or any of its components, may be embodied in the form of a computer system. Typical examples of a computer system include a general-purpose computer, a programmed microprocessor, a microcontroller, a peripheral integrated circuit element, and other devices, or arrangements of devices that are capable of implementing the steps that constitute the method of the disclosure.

The computer system may comprise a computer, an input device, a display unit, and the internet. The computer may further comprise a microprocessor. The microprocessor may be connected to a communication bus. The computer may also include a memory. The memory may be random-access memory or read-only memory. The computer system may further comprise a storage device, which may be a hard disk drive or a removable storage device such as a floppy disk drive, an optical disk drive, an SD card, flash storage, or the like. The storage device may also be a means for loading computer programs or other instructions into the computer system. The computer system may also include a communication unit. The communication unit may allow the computer to connect to other computer systems and the Internet through an input/output (I/O) interface, allowing the transfer and reception of data to and from other systems. The communication unit may include a modem, an Ethernet card, or similar devices that enable the computer system to connect to networks such as LANs, MANs, WANs, and the Internet. The computer system facilitates input from a user through input devices accessible to the system through the I/O interface.

To process input data, the computer system may execute a set of instructions stored in one or more storage elements. The storage element(s) may also hold other data or information, as desired. Each storage element may be in the form of an information source or a physical memory element present in or connected to the processing machine.

The programmable or computer-readable instructions may include various commands that instruct the processing machine to perform specific tasks, such as steps that constitute the method of the disclosure. The systems and methods described can also be implemented using software alone, hardware alone, or a varying combination of the two. The disclosure is independent of the programming language and the operating system used by the computers. The instructions for the disclosure may be written in any programming language, including, but not limited to, assembly language or machine instructions, C, C++, Objective-C, Java, Swift, Python, and JavaScript. Further, software may be in the form of a collection of separate programs, a program module containing a larger program, or a portion of a program module, as discussed in the foregoing description. The software may also include modular programming in the form of object-oriented programming. The processing of input data by the processing machine may be in response to user commands, the results of previous processing, or a request made by another processing machine. The methods and systems of the disclosure may also be implemented using various operating systems and platforms, including, but not limited to, Unix, Linux, BSD, DOS, Windows, Android, IOS, Symbian, a real-time operating system, and a purpose-built operating system. The methods and systems of the disclosure may be implemented using no operating system as well. The programmable instructions may be stored and transmitted on a computer-readable medium. The disclosure may also be embodied in a computer program product comprising a computer-readable medium with any product capable of implementing the above methods and systems or the numerous possible variations thereof.

Boyle, U.S. patent application Ser. No. 17/837,662, filed on Jun. 10, 2022 for an *Automatic Foreign Object Debris Inspection System*, is hereby incorporated by reference in its entirety.

Boyle, U.S. patent application Ser. No. 17/849,708, filed on Jun. 27, 2022 for an *Automatic VGSI Inspection System*, is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

I claim as my invention the following:

1. A system configured to autonomously relocate foreign object debris (FOD) from an assigned FOD collection location on hard surfaces on an airfield to an assigned home FOD dumping location, the system comprising:

a mobile robot comprising one or more sensors, a battery, an on-board computer, a transceiver, an on-board display positioned on a top surface of the mobile robot, a plurality of electric motors, a wheel frame, a lid, a safety programmable logic controller (PLC), and a tow mechanism,         wherein the on-board computer comprises a machine learning model,         wherein the on-board display is configured to receive input from an operator,         wherein the lid is equipped with hardpoint rails configured to enable mounting one or more tools on a top of the mobile robot,         wherein the safety PLC is configured to remove power to the plurality of electric motors and engage a plurality of brakes for the mobile robot,         wherein the mobile robot has a path precision within four inches, and         wherein the plurality of electric motors of the mobile robot allow for a towing capacity of at least 100 pounds while traveling at a speed of at least five mile per hour;

a payload attached to the tow mechanism of the mobile robot, the payload configured to collect the FOD from the assigned FOD collection location on the hard surfaces on the airfield and dump the FOD collected at the assigned home FOD dumping location when commanded by the mobile robot via the transceiver,         wherein the payload is configured to collect objects having a length from 0.125 inch to 8 inches;

a management application configured to capture an identity and physical location of the hard surfaces on the airfield, known obstacles, and boundaries of the airfield; and     a remote server configured to store the identity and the physical location of the hard surfaces on the airfield, the known obstacles, and the boundaries of the airfield, the remote server comprising a routing algorithm capable of automatically generating candidate routes from a first point to a second point and the second point to a third point on the airfield using the hard surfaces on the airfield, avoiding the known obstacles, and staying within the boundaries of the airfield;

wherein the remote server is further configured to calculate a most efficient route of the candidate routes from a current location of the mobile robot as the first point to the assigned FOD collection location including the second point and from the assigned FOD collection location to the assigned home FOD dumping location including the third point along with instructions, based on at least the input received from the operator, for how the mobile robot should command the payload to execute FOD collection at the assigned FOD collection location and how the mobile robot should command the payload to execute dumping the FOD collected at the assigned FOD collection location during the FOD collection at the assigned home FOD dumping location;

wherein the remote server is further configured to send the most efficient route and the instructions to the mobile robot at an assigned time; and wherein the mobile robot is configured to execute traversing the most efficient route and the instructions while detecting unexpected obstacles other than the known obstacles with the one or more sensors, avoiding the known obstacles and the unexpected obstacles, and staying within the boundaries of the airfield.

2. The system according to claim 1, wherein the on-board display further comprises a user interface configured to enable the operator to provide the input to the mobile robot.

3. The system according to claim 1, the system further comprising an end-user device comprising the management application, the management application being further configured to enable the operator to provide the input, and wherein the input includes the assigned FOD collection location and when to begin the FOD collection, the end-user device being capable of connecting to the remote server and further capable of interacting with the mobile robot in operation.

4. The system according to claim 1, wherein the payload has a width ranging from 2 feet to 8 feet, a length ranging from 2 feet to 10 feet, and a height ranging from 1 inch to 12 inches.

\* \* \* \* \*